Sept. 16, 1958

W. W. ARNOLD ET AL 2,852,155

QUICK OPENING DOORS FOR PRESSURE VESSELS

Filed March 14, 1957

INVENTOR.
WALTER W. ARNOLD
FRED HEUSER
BY
Bean, Brooks, Buckley & Bean.
ATTORNEYS

United States Patent Office 2,852,155
Patented Sept. 16, 1958

2,852,155

QUICK OPENING DOORS FOR PRESSURE VESSELS

Walter W. Arnold and Fred Heuser, Snyder, N. Y., assignors to The Wiesner-Rapp Company, Inc., Buffalo, N. Y.

Application March 14, 1957, Serial No. 645,975

2 Claims. (Cl. 220—40)

The principal object of our invention is to provide a closure for autoclaves which shall be provided with antifriction means at the bearing surfaces.

Another object is to provide a closure which shall require only partial rotation of the door or cover to bring the antifriction means into pressure-sealing engagement therewith.

Another object is to provide cam-shaped means on the cover flange for engagement with a series of ball bearings carried by the clamping ring.

A further object is to provide a gasket between the body flange and cover flange of the device which shall be self-sealing.

Moreover, our device comprises means for adjusting the balls carried by the clamping ring whereby even initial pressure may be produced upon the gasket.

Furthermore, our device is so designed that the balls of the clamping ring will engage recesses formed in the cover flange whereby the locking ring will be held against inadvertent opening.

The above objects and advantages have been accomplished by the device shown in the accompanying drawings, of which:

Figure 3:
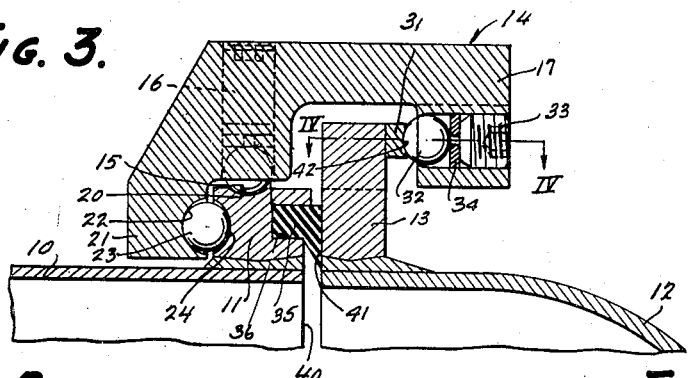
Fig. 3 is an enlarged transverse sectional view taken on line III—III of Fig. 2 showing the parts when in their fully locked position.
Figure 2:
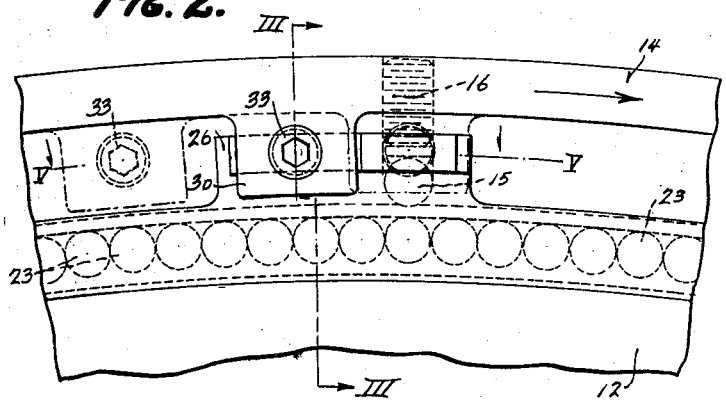
Fig. 2 is an enlarged fragmentary face view thereof showing the parts in their partially locked position.
Figure 4:
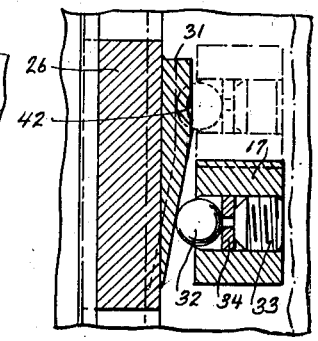
Fig. 4 shows an enlarged fragmentary sectional plan view taken on line IV—IV of Fig. 3 showing the parts in their partially locked position in full lines and in their fully locked position in dot and dash lines.
Figure 1:
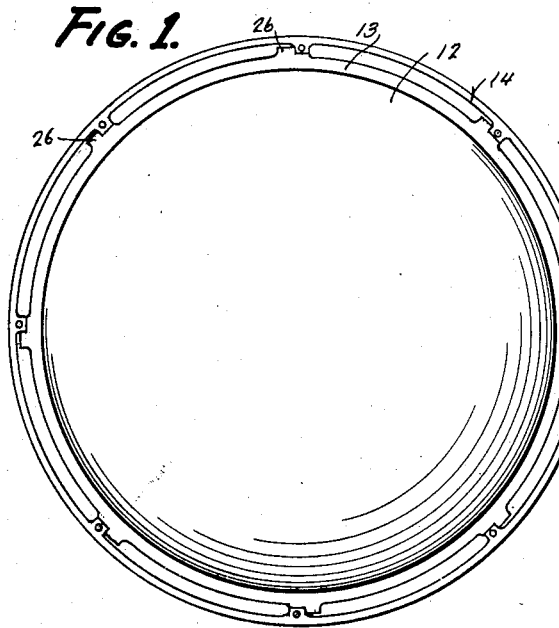
Fig. 1 is a face view of our quick opening cover.
Figure 5:
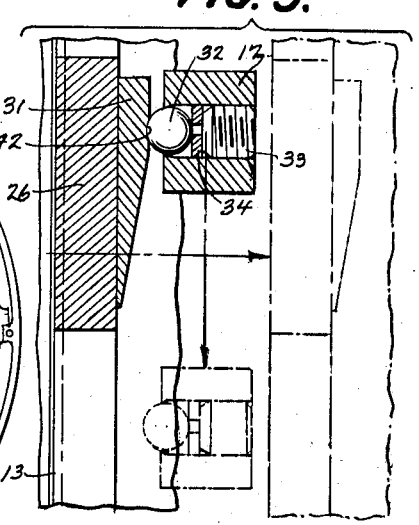
Fig. 5 is a similar enlarged sectional view showing the parts in their fully locked positions in full lines and the lug of the clamping ring in unlocked position in dot and dash lines, also showing the cover flange in its detached and partially open position in dot and dash lines.

In the drawings, 10 represents the body of the vessel to the open end of which is secured the body flange 11. The cover 12 is formed with a cover flange 13 which is secured thereto by any suitable means such as by welding or the like. Rotatably mounted upon the body flange 11 is a clamping ring 14. The clamping ring is provided on its inner periphery with a plurality of centralizing balls 15 which are adjustably held in position by means of a set screw 16 carried by the ring. These balls engage a ball race 20 formed in the outer periphery of the body flange 15. The ring is provided with a rear depending portion 21 formed in the surface facing the body flange 11 with a raceway 22. A series of anti-friction balls 23 is arranged within this raceway and engage with a similar raceway 24 formed in the back adjacent face of the body flange. By means of the antifriction balls 23 and the centralizing balls 15, all rubbing surfaces will be kept separated and the clamping ring will be held in position upon the body flange in antifriction manner. The ring is provided with a forwardly extending rim portion 17 which encloses the cover flange 11.

The cover flange 11 is formed with a plurality of spaced upstanding cover lugs 26, and the rim of the clamping ring is provided on the forward portion of the inner periphery thereof with a plurality of depending ring lugs 30 which are movable to and from positions of registration with the lugs of the cover flange. Each of the lugs 26 of the cover flange is provided with a wedge-shaped member 31 forming a cam for engagement with an antifriction ball 32. Each of these balls is carried by one of the clamping ring lugs and is adjustable by means of an adjusting screw 33. A washer 34 of bronze or other non-ferrous metal is preferably disposed between each of the balls and its adjusting screw. A gasket 35 of rubber or other flexible material is mounted within a groove 36 formed in the body flange 11. The gasket projects beyond the face 40 of the body flange and is provided with an inwardly extending tapered portion 41 so designed that the full area of the contacting surface bears against the cover flange but the tapered portion thereof is subject to the pressure existing on the inside of the autoclave when the cover is closed. By this means the pressure within the autoclave will serve to more firmly seal the gasket and prevent leakage of pressure existing within the body.

When the cover is in its closed position and the antifriction balls 32 are in the positions of dwell upon the wedge-shaped members 31, the adjusting screws 33 are actuated to press the balls into the face of the wedge-shaped members thereby forming a concave recess 42, which forms a lock against the inadvertent openings of the door when pressure exists within the vessel. When the pressure upon the corner is released, the resiliency of the gasket will permit sufficient inward movement of the cover to allow the balls to readily disengage the recesses.

From the foregoing it will be obvious that by means of the individual adjusting clamping balls, uniform pressure around the cover may be provided and indentations may be formed in the engaging surfaces of the cover flange for locking engagement of the ring with the cover when the vessel is under pressure. It will be obvious that the presence of the ball bearings between the engaging surfaces will remove substantially all friction between them.

What is claimed is:

1. A quick operating door for pressure vessels, comprising a flange secured to said vessel at its open end, a cover for closing said vessel, said cover having a plurality of spaced outwardly extending cover lugs, each lug having an inclined outer face, a clamping ring surrounding said cover and having a plurality of spaced inwardly extending ring lugs registerable with said cover lugs upon rotation of said ring, an anti-friction ball carried by each of said ring lugs for camming engagement with the inclined outer face of said cover lugs, and each of said cover lugs being formed with a concave recess for the reception of a co-acting anti-friction ball, whereby said cover will be locked against inadvertent opening when pressure exists within said vessel.

2. A quick operating door for pressure vessels, comprising a flange secured to said vessel at its open end, a cover for closing said vessel, said cover having a plurality of spaced outwardly extending cover lugs, each lug having an inclined outer face, a clamping ring surrounding said cover and having a plurality of spaced inwardly extending ring lugs registerable with said cover lugs upon rotation of said ring, an antifriction ball carried by each of said ring lugs for camming engagement with the inclined outer face of the associated cover lug, and an adjusting screw carried by each of said ring lugs and bearing against said ball for adjusting the tension upon said cover.

References Cited in the file of this patent

UNITED STATES PATENTS

| | | |
|---|---|---|
| 1,738,893 | Grady | Dec. 10, 1929 |
| 2,601,936 | Harris | July 1, 1952 |